United States Patent [19]
Konigsfeld et al.

[11] Patent Number: 5,420,991
[45] Date of Patent: May 30, 1995

[54] APPARATUS AND METHOD FOR MAINTAINING PROCESSING CONSISTENCY IN A COMPUTER SYSTEM HAVING MULTIPLE PROCESSORS

[75] Inventors: Kris G. Konigsfeld, Portland; Jeffrey M. Abramson, Aloha; Haitham Akkary; Glenn J. Hinton, both of Portland; Andrew F. Glew, Hillsboro, all of Oreg.

[73] Assignee: Intel Corporation, Santa Clara, Calif.

[21] Appl. No.: 177,239

[22] Filed: Jan. 4, 1994

[51] Int. Cl.[6] ............................................. G06F 9/46
[52] U.S. Cl. ..................... 395/375; 364/DIG. 1; 364/DIG. 2; 364/262.4
[58] Field of Search ............... 395/425, 375, 400, 800; 364/DIG. 1 MS File, DIG. 2 MS File

[56] References Cited
U.S. PATENT DOCUMENTS

| | | | |
|---|---|---|---|
| 4,722,049 | 1/1988 | Lahti | 395/375 |
| 4,891,753 | 1/1990 | Budde et al. | 395/375 |
| 4,903,196 | 2/1990 | Pomerene et al. | 395/375 |
| 5,056,002 | 10/1991 | Watanabe | 395/425 |
| 5,185,872 | 2/1993 | Arnold et al. | 395/375 |
| 5,241,641 | 8/1993 | Iwasa et al. | 395/425 |
| 5,247,635 | 9/1993 | Kamiya | 395/425 |

OTHER PUBLICATIONS

Val Popescu, et al., "The Metaflow Architecture", Jun. 1991, IEEE Micro, pp. 10–13 and 63–73.

Primary Examiner—Robert B. Harrell
Attorney, Agent, or Firm—Blakely, Sokoloff, Taylor & Zafman

[57] ABSTRACT

An apparatus for maintaining processor ordering in a multi-processor computer system wherein loads are performed speculatively. Speculative loads of each processor are temporarily stored in their respective processors' load buffer. When one of the processors performs a store, a snoop operation is performed on the other processors' load buffers. If the snoop results in a hit, a determination is made as to whether that load buffer contains any prior conflicting speculative loads which have been completed. If the load buffer does contain a prior conflicting load, a processor ordering violation signal is generated. In response to this signal, the violating load and all subsequent operations are canceled and re-executed at a later time.

20 Claims, 5 Drawing Sheets

APPARATUS AND METHOD FOR MAINTAINING PROCESSING CONSISTENCY IN A COMPUTER SYSTEM HAVING MULTIPLE PROCESSORS

FIELD OF THE INVENTION

The present invention relates to the field of computer systems having multiple microprocessors. More specifically, the present invention pertains to an apparatus and method for maintaining processing consistency in a computer system having multiple processors.

BACKGROUND OF THE INVENTION

Historically, the central processing unit (CPU) of computer systems consisted of a single semiconductor chip known as a microprocessor. This microprocessor executed the programs stored in the main memory by fetching their instructions, examining them, and then executing them one after another. Due to rapid advances in semiconductor technology, faster, more powerful and flexible microprocessors were developed to meet the demands imposed by ever more sophisticated and complex software.

Presently, the state-of-the-art in microprocessor design has come to a point where designing the next generation of microprocessors is incredibly costly, labor-intensive, and time-consuming. However, new applications, such as multimedia, which integrates text, audio, speech, video, data communications, and other time-correlated data to create a more effective presentation of information, requires a large amount of processing power to handle in a real-time environment. And with the explosion in network and file server applications, there is a need for processing vast mounts of data in a fast, efficient manner. The trend is for even more complex and lengthier software programs. The processing required to run these applications in real-time is starting to overwhelm even the most powerful of microprocessors.

One solution is to implement multiple processors. A singularly complex task can be broken into sub-tasks. Each sub-task is processed individually by a separate processor. For example, in a multi-processor computer system, word processing can be performed as follows. One processor can be used to handle the background task of printing a document, while a different processor handles the foreground task of interfacing with a user typing on another document. Thereby, both tasks are handled in a fast, efficient manner. This use of multiple processors allows various tasks or functions to be handled by other than a single CPU so that the computing power of the overall system is enhanced. And depending on the complexity of a particular job, additional processors may be added. Utilizing multiple processors has the added advantage that two or more processors may share the same data stored within the system.

In multi-processor systems, care must be taken to maintain processor consistency. Processor consistency is inherently assumed by existing software written for many multi-processor system architectures. For example, assume that processor P1 is a producer of information and processor P2 is the consumer of information. P1 performs a write operation W1 to location 1 followed by a write operation W2 to location 2. Location 2 contains a flag variable that signals that the data in location 1 is valid. Processor P2 continuously performs read operation R2 on location 2 until the flag becomes valid. After the flag is observed valid, P2 performs a read operation R1 on location 1 to read the data. In order for this algorithm to successfully execute in a multi-processor system, the order in which W1 and W2 are written by processor P1 should be the same order in which R1 and R2 appear to be updated to processor P2.

One method of ensuring processor consistency is to impose a mater-slave arrangement, whereby one of the processors (the master) controls the other processors (slaves). However, this arrangement is quite slow and inefficient. Another method involves imposing a strict ordering regiment. Both stores and loads are executed in order (when a program changes a value held in memory, it is performing a store; when a program retrieves data from memory, it is performing a load). In other words, the stores and loads are executed in the same sequence implied by the source program. However, one drawback with in-order execution is that performance suffers. Operating a processor in an out-of-order fashion allows the processor to exploit parallelisms present in the source code. By implementing multiple execution units, parallel sequences can be processed at the same time, thereby minimizing the processing time.

In an out-of-order processor, loads are allowed to pass other loads. This phenomenon is known as speculative loading. However, when a load passes another load which has not yet been executed, there is a potential for a violation of processor ordering. Hence, processor ordering and cache coherency are especially critical for high performance processors that utilize out-of-order processing.

One mechanism for handling potential violations involves the use of "fencing" operations to prevent the violations. However, this approach imposes additional burdens on the programmers. Furthermore, previous coding sequences would be incompatible with this approach. Thus, there is a need in multi-processor computer systems for an apparatus and method for maintaining a processor ordering model. It would be preferable if such an apparatus or method could maintain the processor ordering model in an out-of-order environment, and yet be compatible with previously written source codes.

SUMMARY OF THE INVENTION

The present invention pertains to an apparatus for maintaining processor ordering in a computer system having a processor and one or more agents, wherein loads are performed speculatively and in an out of order sequence with respect to the original programming sequence while maintaining processing consistency. An agent is defined as any device which can perform loads or stores. The speculative, out of order loads of the processor are temporarily stored in that processor's load buffer. When an agent performs a store, a snoop operation is initiated on the load buffer. If the snoop does not result in a hit, the load is allowed to retire. However, if the snoop does result in a hit, a determination is made as to whether that load buffer contains any prior conflicting speculative loads.

If there are no conflicting prior speculative loads in the load buffer, those loads can pass that store. If the load buffer does contain a prior conflicting load, a processor ordering violation signal is generated. In response to this signal, the violating load and all subsequent operations are canceled and re-executed at a later time.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method for maintaining processor ordering in a multi-processor system is described in detail. In the following description for purposes of explanation, specific details such as processor configurations, components, bus hierarchies, etc. are set forth in order to provide a thorough understanding of the present invention. However, it will be apparent to one skilled in the art that the present invention may be practiced without these specific details. In other instances, well known structures, devices, functions, and procedures are shown in block diagram form in order not to avoid obscuring the present invention. It should be noted that the present invention can be applied to a variety of different processor architectures such as those associated with the Pentium ™ processor, Power$^{PC}$ ™ processor, Alpha ™ processor, or any of a host of digital signal processors. Furthermore, the present invention can be practiced in a variety of manners, such as by a single or multiple chip implementation or by fabrication by silicon or gallium arsenide or other processes.

Figure 1:
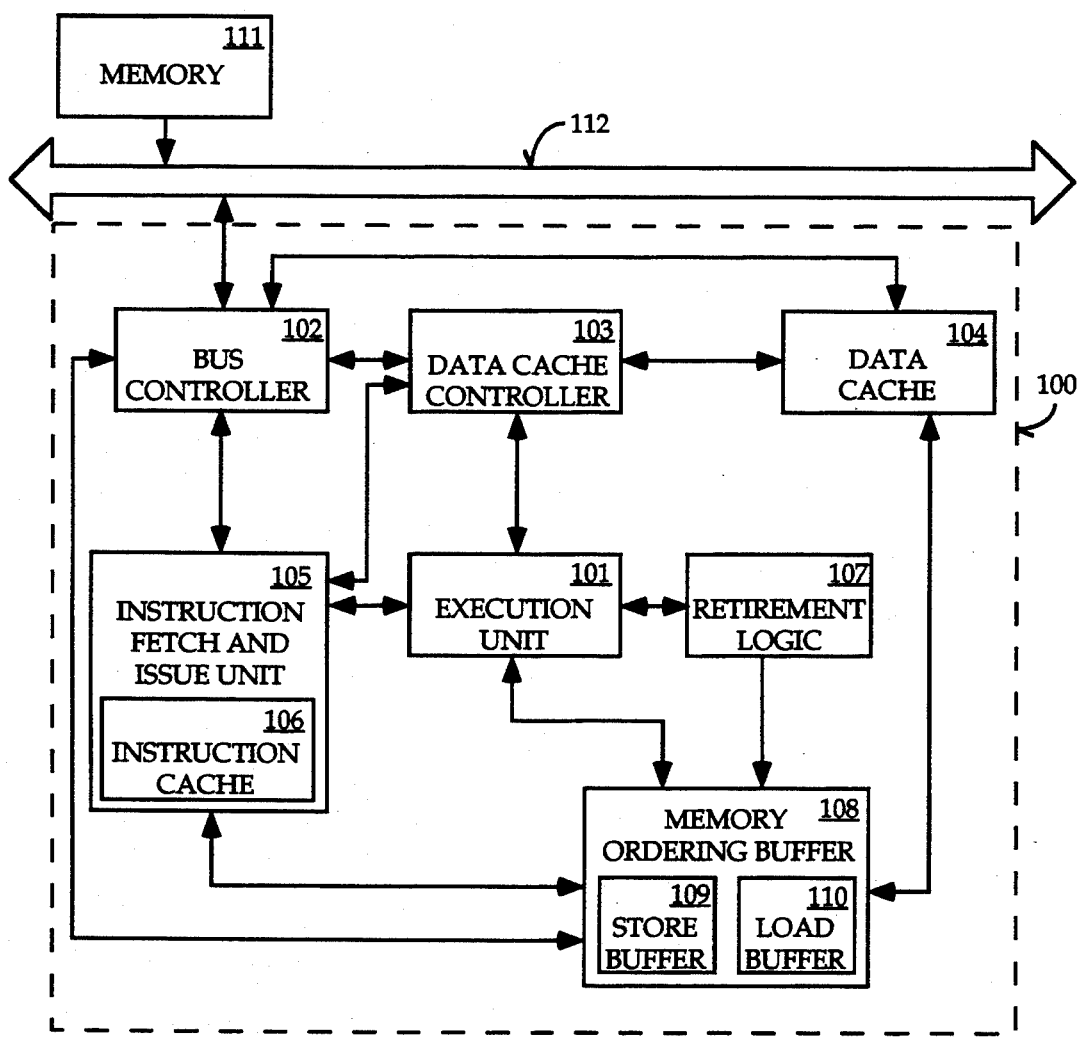
FIG. 1 shows a block diagram illustrating an exemplary processor incorporating the teachings of the present invention.

Referring now to FIG. 1, a block diagram illustrating an exemplary processor 100 incorporating the teachings of the present invention is shown. The exemplary processor 100 comprises an execution unit 101, a bus controller 102, a data cache controller 103, a data cache 104, and an instruction fetch and issue unit 105 with an integrated instruction cache 106. The elements 101–106 are coupled to each other as illustrated. Together they cooperate to fetch, issue, execute, and save execution results of instructions in a pipelined manner.

The instruction fetch and issue unit 105 fetches instructions from an external memory through the bus controller 102 via an external system bus. Bus controller 102 manages transfers of data between external components and processor 100. In addition, it also manages cache coherency transfers. The instruction fetch and issue unit 105 then issues these instructions to the execution unit 101 in an in-order sequence. Basically, the execution unit 101 performs such functions as add, subtract, logical AND, and integer multiply. Some of these instructions are fetched and dispatched speculatively. The execution unit 101 holds and executes the integer and floating point instructions when their operand dependencies on execution results of preceding instructions are resolved. In similar fashion, the execution unit 101 holds and forwards the load and store instructions to the memory ordering buffer 108.

Retirement logic 107 commits the states of these instructions to whatever permanent architectural state that was designated by the original source code. Within memory ordering buffer 108, loads and stores are checked for memory ordering effects. Stores and/or loads are potentially postponed until ordering inconsistencies are resolved.

The memory ordering buffer 108 is comprised of store buffer 109 and load buffer 110. Store buffer 109 is a first-in-first-out (FIFO) structure for storing address, size, data, and other key attributes. The top pointer of the structure points to the store most recently retired. The bottom of store buffer 109 (i.e., the one containing the oldest retired store) is the one ready to be written to a memory subsystem, such as data cache 104. The store buffer 109 is only visible to the processor core (e.g., execution unit 101 and instruction fetch and issue unit 105). External snoops do not recognize the existence of the store.

The load buffer 110 is a scratchpad buffer used by the memory subsystem to impose access ordering on memory loads. Each load operation is tagged with the Store Buffer ID (SBID) of the store previous to it. This SBID represents the relative location of the load compared to all stores in the execution sequence. When the load executes in the memory, its SBID is used as a beginning point for analyzing the load against all older stores in the buffer.

If loads execute out of order, these loads might make other processors' store operations appear to be out of order. This situation might arise when a younger load passes an older load that has not been executed yet (e.g., read operation $R_2$ is executed before a prior read operation $R_1$). This younger load reads old data, while the older load might read new data written by another processor. If allowed to commit to state, these loads would violate processor ordering. The present invention prevents this violation from occurring by utilizing the load buffer 110 to snoop all data writes from other agents on the bus 112. Snooping refers to the act of monitoring data and address traffic for particular values. If another processor writes a location that was speculatively read, that load and subsequent operations are cleared and re-executed to retrieve the correct data (e.g., reimpose processor ordering).

Data cache controller 103 controls the access of data to/from the data cache 104. Data cache 104 is a fast, small, hardware-maintained scratchpad memory which can be reached in fewer clock cycles than main memory by loads and stores. The data cache controller 103 and the data cache 104 respond to the load instructions immediately, forwarding data if necessary. In contrast, store instructions are buffered. In other words, instructions are not necessarily executed/forwarded in the order they were issued. Moreover, some instructions are speculatively executed/forwarded. In any case, the execution results of the integer, floating point, and load instructions are buffered, and then retired or committed in order. In comparison, the buffered store instructions are retired or committed in order and then dispatched in the "background," at the convenience of the memory system. Speculative integer, floating point, and load execution results and buffered stores of mis-predicted branches are purged.

The instruction fetch and execution unit 105 is intended to represent a broad category of instruction fetching and issuing elements found in many computer systems. Their constitutions and functions are well known. In the presently preferred embodiment, the instruction fetch and issue unit 105 includes an instruction cache 106. The instruction cache 106 is a fast local memory that holds the instructions to be executed. When a program attempts to access an instruction that is not yet or no longer in the cache, the processor waits until hardware fetches the desired instructions from another cache or memory downstream. It is the responsibility of the instruction fetch and issue unit 105 to decide which instruction cache entry ought to be accessed next for maximal program performance. In the currently preferred embodiment, the instruction cache 106 and data cache 104 exists in a memory hierarchy.

Figure 2:
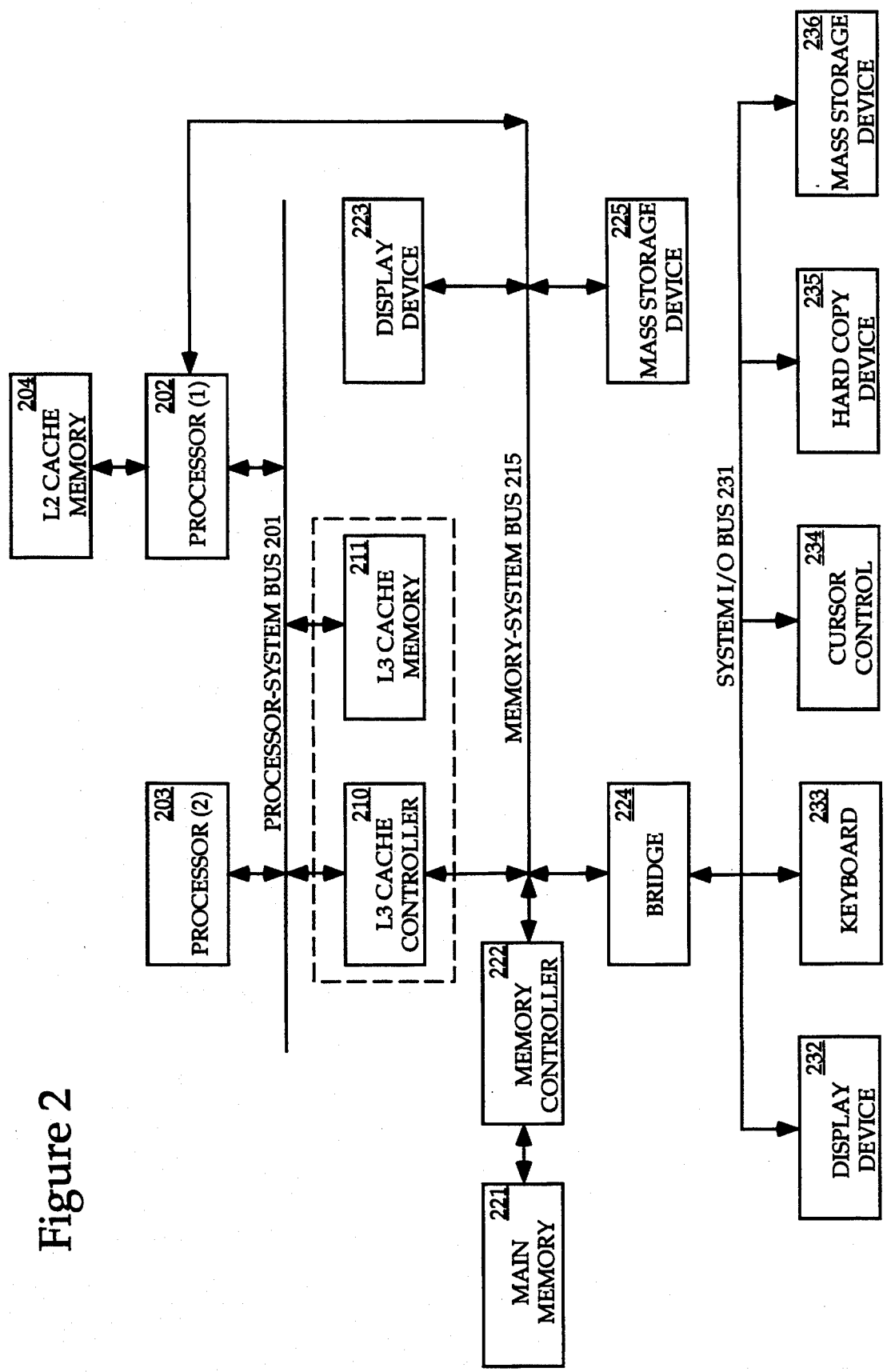
FIG. 2 shows an overview of a multi-processor computer system upon which the present invention may be practiced.

FIG. 2 shows an overview of a multi-processor computer system upon which the present invention may be practiced. The computer system generally comprises a processor-system bus or other communication means 201 for communicating information between one or more processors 202 and 203. Processors 202 and 203 can be of a form as shown in FIG. 1. Processor-system bus 201 includes address, data and control buses. As described above, processors 202 and 203 may include a small, extremely fast internal cache memory, commonly referred to as a level one (L1) cache memory for temporarily storing data and instructions on-chip. In addition, a bigger, slower level two (L2) cache memory 204 can be coupled to processor 202 for temporarily storing data and instructions for use by processor 202. In the currently preferred embodiment, the L1 and L2 cache memories are included in the same chip package as processor 202.

Also coupled to processor-system bus 201 is processor 203 for processing information in conjunction with processor 202. Processor 203 may comprise a parallel processor, such as a processor similar to or the same as processor 202. Alternatively, processor 203 may comprise a co-processor, such as a digital signal processor. Furthermore, a level three (L3) cache memory 211 for temporarily storing data and instructions for use by other devices in the computer system (e.g., processor 202, processor 203, etc.) and a L3 cache controller 210 for controlling access to L3 cache memory 211 may also be coupled to processor-system bus 201. The L3 cache controller 210 is also coupled to memory-system bus 215.

A memory-system bus or other communication means 215 for communicating information is coupled to processor 202 for providing processor 202 and other devices in the computer system access to the memory and input/output (I/O) subsystems. A memory controller 222 is coupled with memory-system bus 215 for controlling access to a random access memory (RAM) or other dynamic storage device 221 (commonly referred to as a main memory) for storing information and instructions for processor 202 and processor 203. Memory controller 212 maintains the order of read and write operations based on specific rules described in detail below. A mass data storage device 225, such as a magnetic disk and disk drive, for storing information and instructions, and a display device 223, such as a cathode ray tube (CRT), liquid crystal display (LCD), etc., for displaying information to the computer user are coupled to memory-system bus 215.

An input/output (I/O) bridge 224 is coupled to memory-system bus 2 15 and I/O bus 23 1 to provide a communication path or gateway for devices on either memory-system bus 215 or I/O bus 231 to access or transfer data between devices on the other bus. Essentially, bridge 224 is an interface between the system I/O bus 231 and the memory-system bus 215. Specifically, bridge 224 turns the byte/word/dword data transfer traffic from I/O bus 231 into line size traffic on memory-system bus 215.

I/O bus 231 communicates information between devices in the computer system. Devices that may be coupled to system bus 231 include a display device 232, such as a cathode ray tube, liquid crystal display, etc., an alphanumeric input device 233 including alphanumeric and other keys, etc., for communicating information and command selections to other devices in the computer system (e.g., processor 202) and a cursor control device 234 for controlling cursor movement. Moreover, a hard copy device 235, such as a plotter or printer, for providing a visual representation of the computer images and a mass storage device 236, such as a magnetic disk and disk drive, for storing information and instructions may also be coupled to system bus 231.

Of course, certain implementations and uses of the present invention may not require nor include all of the above components. For example, in certain implementations, the L3 cache controller and L3 cache memory may not be required. In such implementations processor 202 and 203 will reside directly on a memory-system bus 215. In other implementations, it may not be required to provide a display device for displaying information. Certain implementations of the present invention may include additional processors or other components.

Figure 3:
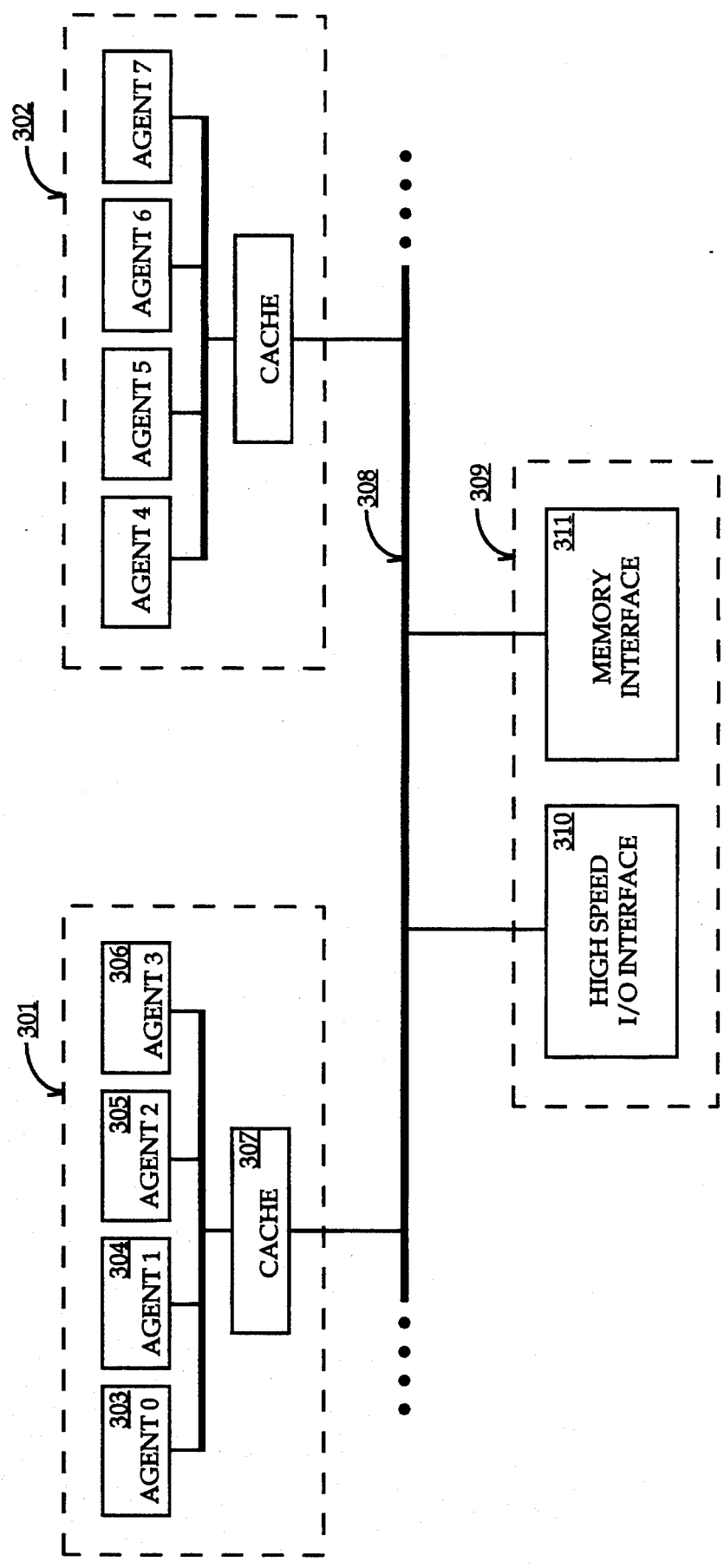
FIG. 3 is a block diagram showing a bus cluster system upon which the present invention may be practiced.

FIG. 3 is a block diagram showing a bus cluster system upon which the present invention may be practiced. The present invention can apply to multi-processor computer systems having one or more clusters of agents. FIG. 3 shows two such clusters 301 and 302. Each of these clusters are comprised of any number of agents. For example, cluster 301 is comprised of four agents 303–306 and a cache 307. Agents 303–306 can include other microprocessors, co-processors, digital signal processors, direct memory access (DMA) controllers, input/output (I/O) devices, I/O bridges, network devices/controllers, separate caches with or without corresponding processors, etc. In short, an agent can be any device that can perform either loads or stores. Cache 307 is shared between these four agents 303–306. Each cluster is coupled to a system bus 308. These clusters 301–302 are coupled to various other components of the computer system through a system interface 309. The system interface 309 includes a high speed I/O interface 3 10 for interfacing the computer system to the outside world and a memory interface 311 which provides access to a main memory, such as a DRAM memory array.

In the present invention, processor ordering is inherently assumed by existing software written for most processor system architectures. Support for processor ordering implies that stores generated by any processor in the system are observed in the same order by all processors of the system. In other words, the order of the stores must be maintained. Source codes requiring a producer/consumer relationship depend on this support to ensure proper functionality.

For example, assume that processor 303 is a producer of information and processor 304 is a consumer of that information being generated by processor 303. The code sequences for both the producer and consumer processors are given as follows:

| Producer | Consumer |
|---|---|
| W1: store data to address X | R1: while flag = 0; loop a1 |
| W2: store 1 to flag | R2: load data from address X |

Consequently, the producer processor 303 performs a write operation W2 of data to address X, followed by a second write operation W2 to set the flag to a "1", thereby indicating that the data in address X is valid. Meanwhile, the consumer processor 304 continuously performs a read operation R2 to determine whether the flag has been set to a "1". This R2 read operation is continuously performed until the flag is set to a "1" (by producer processor 303). Once the flag is observed to have been set (e.g., "1"), the consumer processor 304 performs a read operation R2 to load the data from address X. In order for this piece of code to be successfully executed in the multi-processor system, the order in which W1 and W2 are written by the producer processor 303 should be the same order in which R1 and R2 appear to be updated to the consumer processor 304.

In the present invention, performance is maximized by implementing speculative processor ordering while preventing processor ordering violations. In the currently preferred embodiment, stores remain in order and are consistent. However, loads are allowed to pass other loads. Store instructions are retired immediately and remain in the store buffer, since retirement does not require a cache/memory access. These stores, known as "senior" stores are executed to memory in the background. The contents of the cache/memory system remain unchanged.

While two consecutive stores (i.e., W1 and W2) have retired in the senior store buffer, the existence of the stores is visible only to the producer processor and not to any consumer processors. If the producer processor reads from the same address locations, it is forwarded to the core directly from the store buffer. This mechanism is known as "store forwarding." Note that this mechanism maintains processor ordering of the processor with respect to its own writes. At this time, if any consumer processor in the system reads from the two locations, neither will reflect the effect of the two stores. This ensures that the processor ordering is maintained for the two writes with respect to all other processors. The senior stores so retired, exit the store buffer one at a time. This causes a memory system update. Hence, the W1 store is guaranteed to be the first to exit the senior store buffer. Since no subsequent store is allowed to exit the senior store buffer unit the system memory is assured to be updated.

When a load passes another load (e.g., speculative load operations), the load buffer snoops the stores from other processors. If an external store conflicts with a load that has already been completed with an earlier load that is still outstanding, this indicates the detection of a violation. In one embodiment, a load is considered to be outstanding if it has not yet been loaded from memory. In an alternative embodiment, outstanding means that memory has been accessed, but the load has not been retired yet. In this alternative embodiment, false violations may occur. This does not hinder correctness, but impacts performance. The illegal load and all subsequent micro-operations (microcode including source fields, destination, immediates, and flags) are aborted. The sequence is then restarted at the load that initiated the abort condition. By redispatching the load at a later time, the correct data is read.

An example is now offered to demonstrate the processor ordering operation with regards to the read/write sequence (R1, R2, W1, and W2) for the producer processor 303 and consumer processor 304 described above. Assume that the load R2 is speculatively processed before that of the prior load R1, thereby resulting in a processor ordering violation. This violation is detected when the store W2 causes a snoop hit on the already completed load R2 while load R1 is still outstanding. When the violation is detected, it is corrected by aborting load R2. In addition, all subsequent speculative states are cleared. Later, the load R2 is redispatched. It accesses the valid data at that time.

Figure 4:
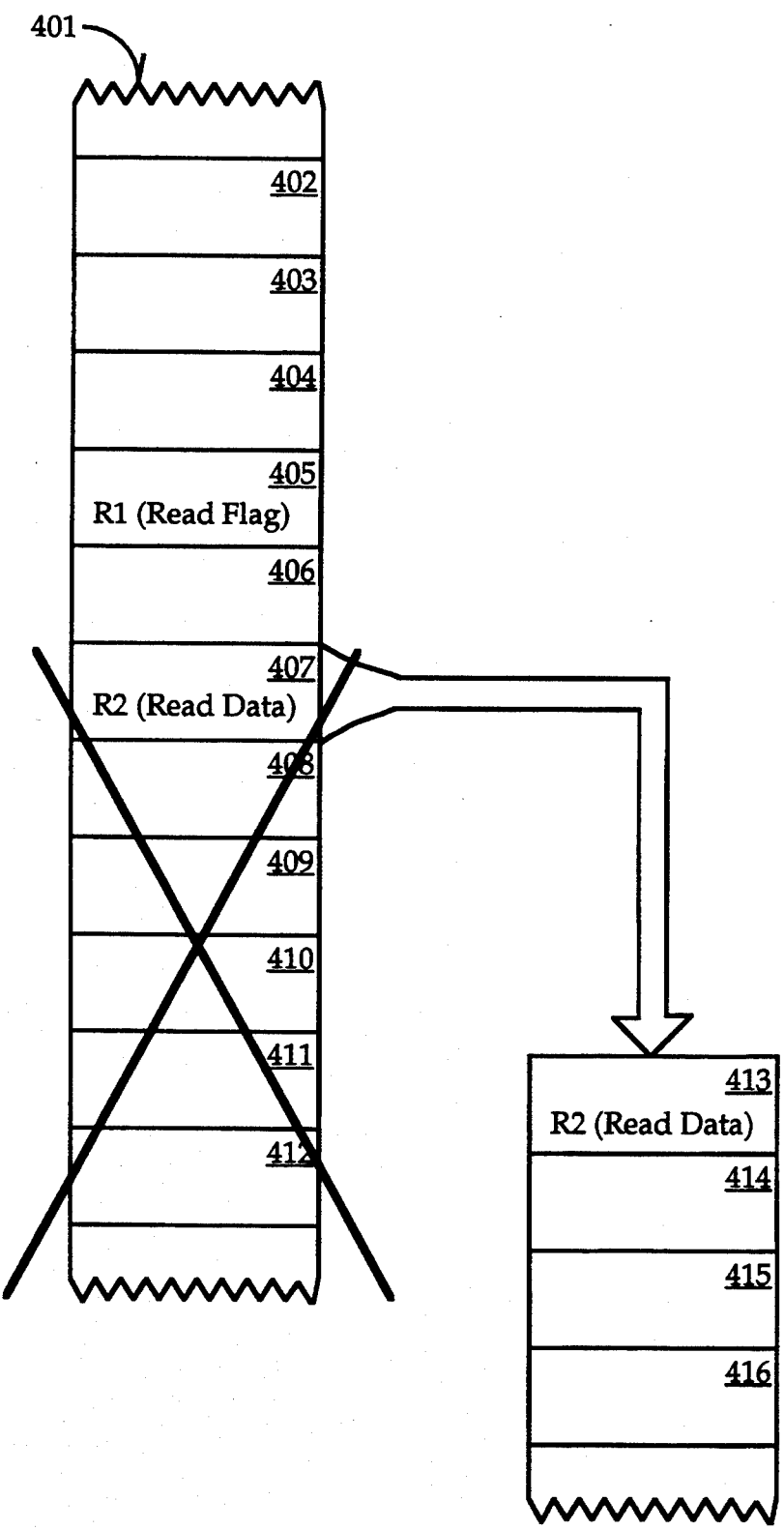
FIG. 4 shows an example of an abort and redispatch process.

FIG. 4 shows an example of an abort and redispatch process. A program flow sequence 401 having multiple states 402–412 is shown. Speculative processing leads to a speculative load R2 being completed before a prior load R1. This violation is detected by snooping the load buffer when the external store W2 is executed. The detected violation results in the R2 load 407 along with all subsequent states 408–412 being cleared. Later, the R2 load is redispatched. Furthermore, all the following speculative states 414–416 are re-calculated.

In the currently preferred embodiment, only a subset of the physical address bits are snooped. This embodiment might cause false snoop hits if the partial address matches an aliased address. False snoop hits pose no problems with respect to the correctness of processor ordering. However, false snoop hits result in the generation of false violations and violation recoveries. Excessive false snoop hits would degrade performance. Hence, utilizing a subset of the physical address bits is a tradeoff between hardware storage of the address versus performance. Furthermore, the memory system manages stores in chunks of cache lines (e.g., 32 bytes), so the store is only visible over that range (e.g., 32 bytes).

Figure 5:
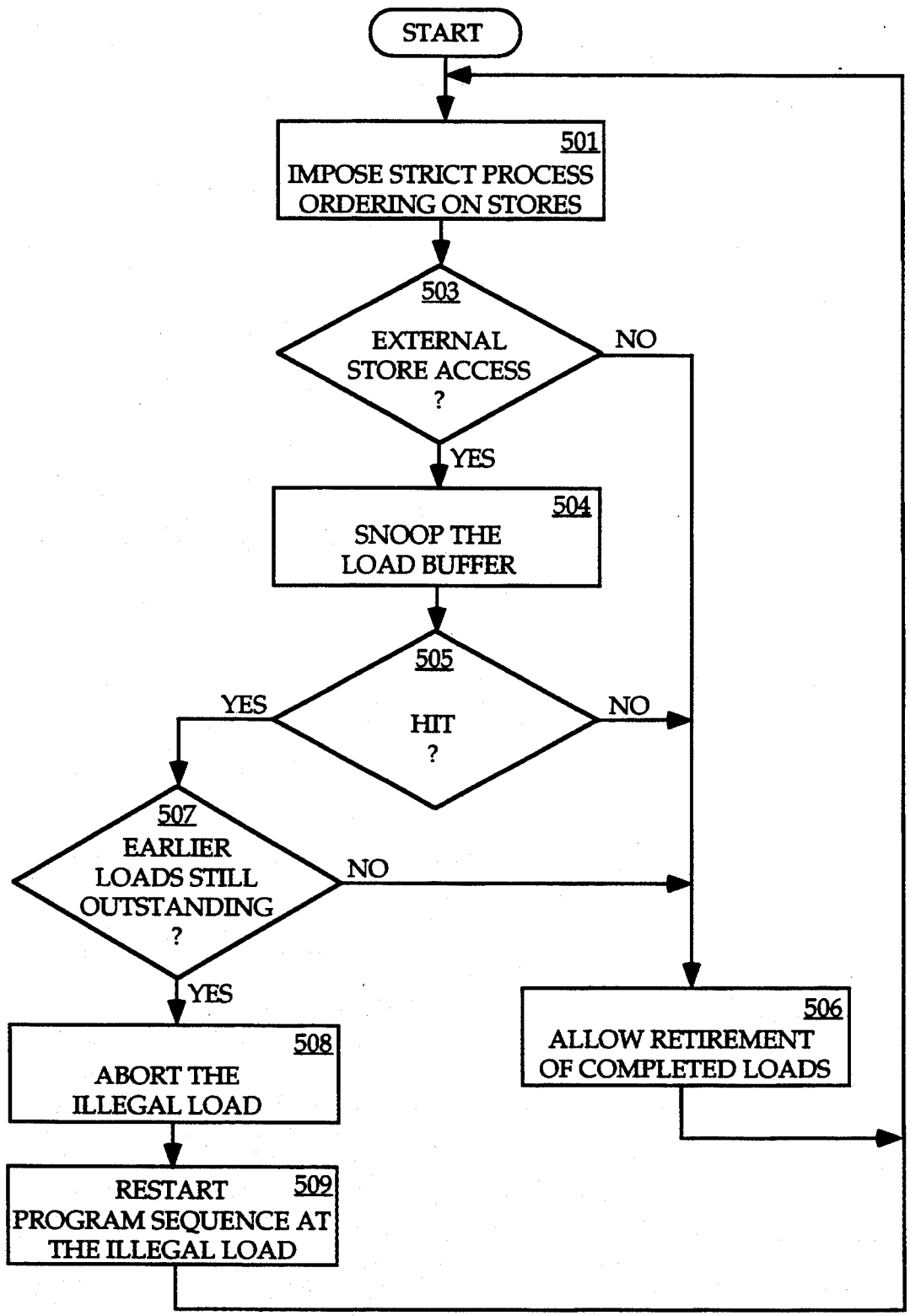
FIG. 5 is a flowchart describing the steps for providing a memory consistency model (i.e., process ordering) in a multi-processor system.

FIG. 5 is a flowchart describing the steps for providing a memory consistency model (i.e., process ordering) in a multi-processor system. In step 501, strict processor ordering is imposed on stores. In other words, stores are not allowed to pass other stores. Loads are allowed to pass other loads or other stores. When another processor performs a store, the original processor's load buffer is snooped, steps 503 and 504. A determination is made as to whether the snoop results in a hit, step 505. A hit occurs if the store matches the address of a load currently residing in the load buffer. If the snoop does not result in a hit (i.e., a miss), step 501 is repeated. Note that non-snooped and snooped but not hit loads are allowed to retire in the normal manner, step 506.

If the snoop results in a hit, a determination is made as to whether the load buffer contains an earlier load that is still outstanding, step 507. If there is no such earlier outstanding load, then the completed stores and speculative loads are allowed to retire, step 506. Retirement refers to the act of removing a completed micro-operation from the re-order buffer and committing its state to whatever permanent architectural state that was designated by the original instruction. Step 501 is repeated following step 506. Otherwise, a processor violation has occurred and is detected. The violation causes a fault signal to be generated. The fault signal from the memory subsystem is used to abort the illegal load (i.e., the load which caused the violation), step 508. Next, the program sequence following the illegal load is aborted and restarted at a later time, step 509. The process repeats, beginning with step 501.

Thus, an apparatus and method for maintaining processing consistency in a computer system having multiple processors is disclosed.

What is claimed is:

1. In a computer system having a processor, an agent, and a bus coupling said processor to said agent, a method of executing read operations of a computer program on said processor in an execution sequence that is different from a program sequence while programming consistency is maintained, said method comprising the steps of:

said processor storing a plurality of read operations in a buffer of said processor;

said agent performing a write operation;

said processor comparing an address of said write operation to addresses of said read operations stored in said buffer;

if said address of said write operation matches one of said addresses of said read operations stored in said buffer, said processor making a determination whether said buffer contains an earlier read operation that is outstanding, wherein said earlier read operation is earlier in said program sequence than said read operation having said address that matches said address of said write operation;

generating a violation signal if said buffer contains said earlier read operation that is outstanding;

said processor clearing said read operation having said address that matches said address of said write operation in response to said violation signal; and said processor re-executing said read operation that had been cleared.

2. The method of claim 1 further comprising the step of clearing all operations subsequent to said read operation having said address that matches said address of said write operation in response to said violation signal.

3. The method of claim 1 further comprising the step of clearing operations dependent on said read operation.

4. The method of claim 1 further comprising the step of:

retiring read operations of said buffer if said write operation address of said agent corresponds to one of said addresses of said read operations stored in said buffer and there are no prior outstanding read operations stored in said buffer.

5. The method of claim 1, wherein said comparing step compares a partial address of said write operation.

6. In a computer system having a processor means, an agent means, and a bus means coupling said processor means to said agent means, an apparatus for executing read operations of a computer program in an execution sequence that is different from a program sequence while maintaining programming consistency, said apparatus comprising:

storage means for storing a plurality of read operations of said processor, wherein said read operations are stored in said execution sequence;

means for said agent performing a write operation;

comparing means for comparing an address of said write operation to addresses of said read operations stored in said storage means;

means for determining whether said storage means contains an earlier read operation that is still outstanding if said address of said write operation matches one of said addresses of said read operations stored in said storage means, wherein said earlier read operation is earlier in said program sequence than said read operation having said address that matches said address of said write operation;

means for generating a violation signal if said storage means contains said earlier read operation;

means for clearing said read operation having said address that matches said address of said write operation in response to said violation signal; and means for re-executing said read operation that had been cleared.

7. The apparatus of claim 6 further comprising a means for clearing all operations subsequent to said read operation having said address that matches said address of said write operation in response to said violation signal.

8. The apparatus of claim 6 further comprising a means for clearing operations dependent on said read operation.

9. The apparatus of claim 6 further comprising means for retiring read operations of said buffer if said write operation of said agent means corresponds to one of said addresses of said read operations stored in said memory means and there are no prior outstanding read operations stored in said memory means.

10. The apparatus of claim 6, wherein said comparing means compares a partial address of said write operation.

11. In a computer system having a processor, an agent, and a bus coupling said processor to said agent, an apparatus for maintaining processor ordering corresponding to speculative read operations, said apparatus comprising:

a load buffer for temporarily storing addresses of read operations of said processor;

a comparator coupled to said load buffer for determining whether an address of a write operation of said agent matches one of said addresses of said load buffer;

a circuit for determining whether said load buffer contains an earlier read operation that is outstanding, wherein said earlier read operation is earlier in a program sequence than said read operation having said address that matches said address of said write operation;

a generator for generating a processor ordering violation signal if said load buffer does contain said earlier read operation that is outstanding; and a cancellation circuit for canceling said read operation having said address that matches said address of said write operation in response to said violation signal.

12. The apparatus of claim 11, wherein said cancellation circuit cancels all operations subsequent to said read operation having said address that matches said address of said write operation in response to said violation signal.

13. The apparatus of claim 11, wherein said cancellation circuit cancels operations dependent on said read operation.

14. The apparatus of claim 11 further comprising a retirement circuit for retiring read operations corresponding to said addresses stored in said load buffer if said write operation of said agent corresponds to said one of said addresses of said read operations and there are no prior outstanding read operations.

15. The apparatus of claim 11, wherein said comparator compares a partial address of said write operation.

16. A computer system comprising:

a bus;

a main memory coupled to said bus for storing digital data;

an agent coupled to said bus for performing read/write operations; and a microprocessor coupled to said bus for processing said digital data, said microprocessor including, a load buffer for temporarily storing addresses of read operations of said microprocessor, a comparator coupled to said load buffer for determining whether an address of a write operation of said agent matches one of said addresses of said load buffer, a circuit for determining whether said load buffer contains an earlier read operation that is outstanding, wherein said earlier read operation is earlier in a program sequence than said read operation having said address that matches said address of said write operation, a generator for generating a processor ordering violation signal if said load buffer does contain said earlier read operation that is outstanding, and a cancellation circuit for canceling said read operation having said address that matches said address of said write operation in response to said violation signal.

17. The computer system of claim 16, wherein said cancellation circuit cancels all operations subsequent to said read operation having said address that matches said address of said write operation in response to said violation signal.

18. The computer system of claim 16, wherein said cancellation circuit cancels operations dependent on said read operation.

19. The computer system of claim 16 further comprising a retirement circuit for retiring read operations corresponding to said addresses stored in said load buffer if said write operation of said agent corresponds to said one of said addresses of said read operations and there are no prior outstanding read operations.

20. The computer system of claim 16, wherein said comparator compares a partial address of said write operation.

* * * * *

UNITED STATES PATENT AND TRADEMARK OFFICE
CERTIFICATE OF CORRECTION

PATENT NO.   :   5,420,991
DATED        :   May 30, 1995
INVENTOR(S)  :   Konigsfeld et al.

It is certified that error appears in the above-identified patent and that said Letters Patent is hereby corrected as shown below:

Column 1,
at line 34 delete "mounts" and insert --amounts--

Signed and Sealed this

Tenth Day of December, 1996

Attest:

BRUCE LEHMAN

Attesting Officer            Commissioner of Patents and Trademarks